(12) United States Patent
Song et al.

(10) Patent No.: US 6,622,560 B2
(45) Date of Patent: Sep. 23, 2003

(54) ULTRASOUND IMAGING METHOD AND APPARATUS BASED ON PULSE COMPRESSION TECHNIQUE USING A SPREAD SPECTRUM SIGNAL

(75) Inventors: Tai Kyong Song, Seoul (KR); Yang Mo Yoo, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 48 days.

(21) Appl. No.: 09/882,751

(22) Filed: Jun. 15, 2001

(65) Prior Publication Data

US 2002/0005071 A1 Jan. 17, 2002

(30) Foreign Application Priority Data

Jun. 17, 2000 (KR) ........................................ 2000-33417

(51) Int. Cl.[7] ............................ G01N 29/06; A61B 8/00
(52) U.S. Cl. .............................. 73/606; 73/602; 73/626; 73/659; 73/861.25; 600/447
(58) Field of Search ........................... 73/606, 602, 624, 73/627, 628, 659, 861.25, 626; 600/443, 455, 441, 456–459

(56) References Cited

U.S. PATENT DOCUMENTS

| | | | | |
|---|---|---|---|---|
| 4,848,354 A | * | 7/1989 | Angelsen et al. | 600/441 |
| 5,938,611 A | * | 8/1999 | Muzilla et al. | 600/455 |
| 5,964,706 A | * | 10/1999 | Mo et al. | 600/443 |
| 6,010,456 A | * | 1/2000 | Rhyne | 600/447 |
| 6,095,977 A | * | 8/2000 | Hall et al. | 600/443 |
| 6,155,980 A | * | 12/2000 | Chiao et al. | 600/447 |
| 6,309,356 B1 | * | 10/2001 | Ustuner et al. | 600/443 |
| 6,343,510 B1 | * | 2/2002 | Neeson et al. | 73/602 |
| 6,350,240 B1 | * | 2/2002 | Song et al. | 600/443 |

FOREIGN PATENT DOCUMENTS

| | | |
|---|---|---|
| EP | 0 947 853 A2 | 10/1999 |
| JP | 7-51266 | 2/1995 |
| JP | 9-5310 | 1/1997 |
| JP | 9-46178 | 2/1997 |

\* cited by examiner

Primary Examiner—Hezron Williams
Assistant Examiner—Jacques Saint-Surin
(74) Attorney, Agent, or Firm—Wiggin & Dana LLP; Dale L. Carlson; Michael K. Kinney (57) ABSTRACT

An ultrasound imaging method forms an image of an object using signals reflected from the object after transmitting an ultrasound pulse to the object. In the method, at a first step, a predetermined first spread spectrum signal is converted to the ultrasound signal at one or more transducers and the ultrasound signal is transmitted to the object. At a second step, pulse compression is performed on a reflected signal of the ultrasound signal reflected from the object to form a pulse compressed signal. And the pulse compressed signal is processed to produce a receive-focused signal and the image of the object from the receive-focused signal is generated.

13 Claims, 9 Drawing Sheets

ULTRASOUND IMAGING METHOD AND APPARATUS BASED ON PULSE COMPRESSION TECHNIQUE USING A SPREAD SPECTRUM SIGNAL

BACKGROUND OF THE INVENTION

1. Field of the Invention

The present invention relates to an ultrasound imaging system. In particular, the invention relates to an ultrasound imaging system based on a pulse compression technique using a spread spectrum signal and a FIR filter having an efficient hardware structure.

2. Description of the Related Art

Figure 1:
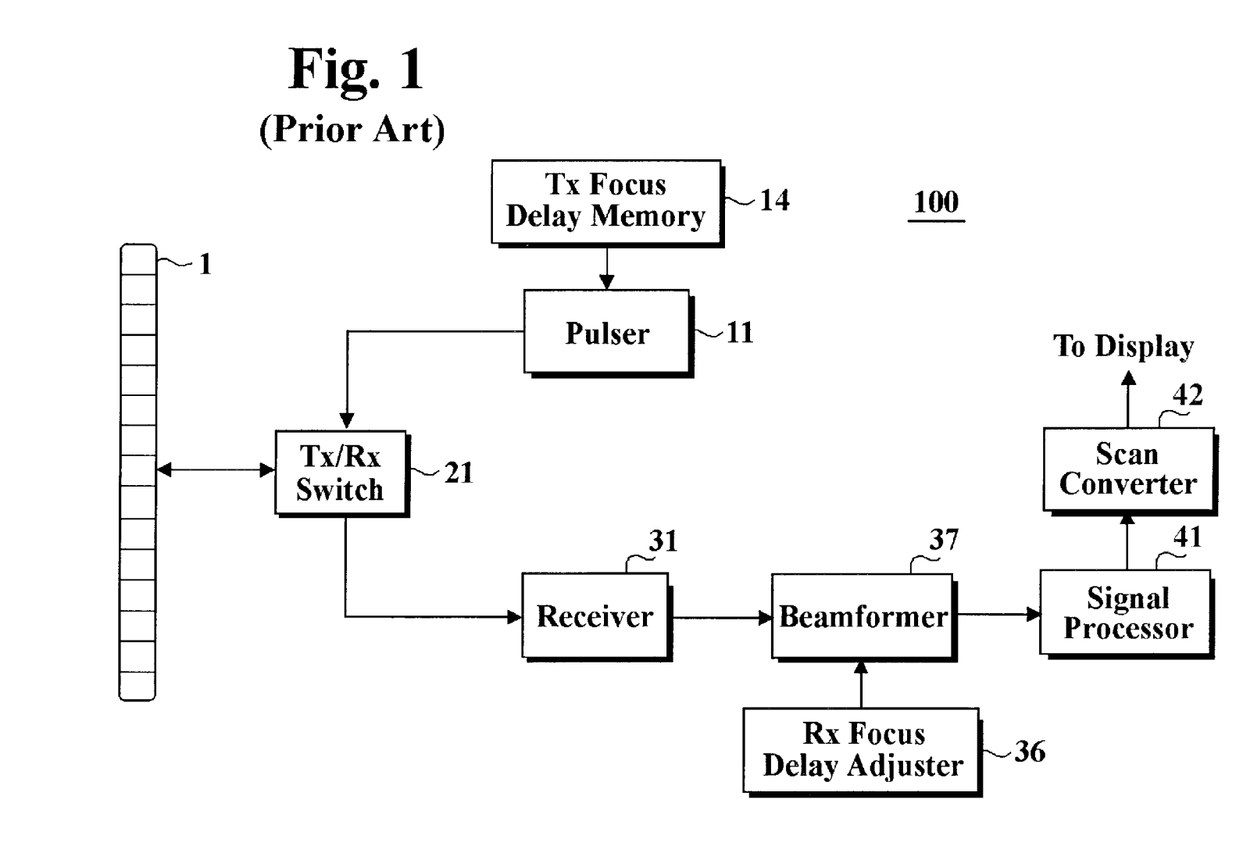
FIG. 1 is a block diagram of a conventional ultrasound imaging system using short pulses.

Conventionally, a medical ultrasound imaging system obtains information about a human body by transmitting short ultrasound pulses into the body and receiving a signal reflected from inside the body. FIG. 1 shows a block diagram of a conventional short-pulse ultrasound imaging system 100, which comprises a transducer array 1 having a plurality of transducers, a pulser 11, a TX(transmission) focus delay memory 14, a TX/RX(receiving) switch 21, a receiver 31, a beamformer 37, an RX focus delay adjuster 36, a signal processor 41 and a scan converter 42.

Specifically, a delay pattern of ultrasound pulses to be transmitted into an object, e.g., a human body, from the transducer array 1 is first stored in the TX focus delay memory 14. Thereafter, a binary sequence corresponding to the delay pattern stored in the TX focus delay memory 14 is generated and provided to the pulser 11.

As a method of determining the delay pattern for each of the transducers, a fixed-focusing technique is commonly used, which focuses the energies of the ultrasound pulses on a predetermined point inside the human body. Recently, as one of efforts to resolve the problem of limited resolution due to the fixed-focusing transmission compared to dynamic focusing receiving, a synthetic aperture technique has been studied. With the synthetic aperture technique, one or more transducers can be used for transmitting ultrasound pulses and bi-directional dynamic focusing is possible for both the transmitting and receiving pulses. By using the synthetic aperture technique, the resolution can be improved while SNR (signal-to-noise ratio) is decreased.

The pulser 11 is a bipolar pulser, which supplies an amplified signal (e.g., +80 or −80 volt) to the transducer array 1 in response to the binary sequence from the TX focus delay memory 14. The voltage output of the pulser 11, having a predetermined amplitude, is applied to each transducer of the transducer array 1 at a time determined by the delay pattern.

The transducer array 1 transmits the ultrasound pulses, in response to the output voltage of the pulser 11, into the object. A portion of the transducers in the transducer array 1 may selectively be used for one time transmission even if the transducer array 1 includes N, e.g., 128, transducers. For example, only 64 transducers within an aperture may be utilized for transmitting the ultrasound pulse at one time.

After transmitting the ultrasound pulses into the body, the transducer array 1 receives a pulse signal that is reflected from the body.

The TX/RX switch 21 acts as a duplexer for isolating the receiver 31 from the pulser 11 to protect the high voltage output from being applied to the receiver 31. The switch 21 connects the transducer array 1 to the pulser 11 during the transmission mode and to the receiver 31 during the reception mode.

The receiver 31 includes a pre-amplifier for amplifying the received signal, a TGC (time gain compensator) for compensating the attenuation during propagation of the ultrasound pulses and an analog-to-digital converter for converting the amplified received signal to a corresponding digital signal.

The beamformer 37 performs RX focusing for the corresponding digital signal that is provided from the receiver 31 in accordance with the delay pattern from the RX focus delay adjuster 36.

The signal processor 41 performs the signal processing such as envelope detection, log compensation to produce a B-mode image signal.

The scan converter 42 converts the B-mode image signal to a signal, which can be represented on a display device (not shown).

Due to the decrease in power of the ultrasound pulse during the propagation into highly attenuating medium such as rubber, soft tissue and the like, the short-pulse imaging system may not obtain correct information for a target object deep inside the body.

Since the medical ultrasound imaging system 100 may cause damage to the body if it increases the peak voltage of the transmitted short pulses, the power of the received signal cannot be increased by increasing the power of transmission pulse.

On the other hand, a pulse compression technique that is used in a radar apparatus is capable of improving the SNR of the ultrasound imaging system by increasing the average power of the transmitted pulse instead of increasing the peak voltage thereof. In an imaging system using such a pulse compression technique, generally, a long-duration waveform signal ("long pulse") instead of the short pulse is transmitted to the body to increase the SNR.

In the medical imaging system 100 using the conventional short pulse, the image resolution in the ultrasound propagation direction depends on the impulse response of the ultrasound transducer which is selected and used due to the use of short pulses with a high voltage. However, in the imaging system using the pulse compression technique, the image resolution is determined by the convolution of the ultrasound transducer and the long pulse.

In an imaging system using the pulse compression technique, by using a pulse compressor having a FIR (Finite Impulse Response) filter at the ultrasound receiver, it is capable of effectively increasing the SNR by transmitting the long pulse signal having a lower voltage than the peak voltage in the short pulse technique.

In the ultrasound imaging system using the long pulse signal, the system performance is known to depend on characteristics of the long pulse signal used therein. In particular, the image quality is based on the relationship between the frequency characteristics of the long pulse signal and the ultrasound transducer. The system performance also depends on how the pulse compressor or the FIR filter is implemented.

Further, since the pulse compressor should be used per each channel for dynamic RX focusing, hardware complexity of the receiving part of the system depends on a structure of the pulse compressor.

In the ultrasound imaging system using the long pulse signal, a spread spectrum signal, e.g., a chirp signal (a linear frequency modulation signal), can be used as the long pulse signal. Particularly, The chirp signal has frequency characteristic that matches with the spectrum of the transducer of the ultrasound imaging system having a limited bandwidth. The chirp signal after passing the conventional FIR filter also has its peak side lobes that are −13 dB below its main lobe. However, the conventional spread spectrum signal is not suitable for use in the medical ultrasound imaging system because side lobes of the spectrum of the output signal from the pulse compressor should be −50 dB or more below the main lobe, to be used in the medical imaging system.

SUMMARY OF THE INVENTION

It is, therefore, a primary objective of the present invention to provide an ultrasound imaging method and system based on a pulse compression technique that uses a spread spectrum signal having tolerable side lobes.

Another objective of the present invention is to provide a FIR filter having an efficient structure and a method of determining the coefficients of the FIR filter for use in the ultrasound imaging system using the spread spectrum signal.

In accordance with one aspect of the present invention, there is provided an ultrasound imaging method for forming an image of an object using signals reflected from the object after transmitting an ultrasound pulse to the object, comprising the steps of (a) converting a predetermined first spread spectrum signal to the ultrasound signal at one or more transducers and transmitting the ultrasound signal to the object, (b) performing pulse compression on a reflected signal of the ultrasound signal reflected from the object to form a pulse compressed signal, and (c) processing the pulse compressed signal to produce a receive-focused signal and generating the image of the object from the receive-focused signal.

In accordance with another aspect of the present invention, there is provided an ultrasound imaging apparatus for forming an image of an object using a signal reflected from the object and received after transmitting an ultrasound signal to the object, comprising one or more transducers for transmitting the ultrasound signal to the object in response to the predetermined spread spectrum signal, a receiving unit for receiving the reflected signal of the transmitted ultrasound signal from the object, a pulse compression unit for performing pulse compression on the reflected signal to produce a pulse-compressed signal, and an image forming unit for producing a receive-focused signal by using the pulse-compressed signal to form the image of the object.

BRIEF DESCRIPTIONS OF THE DRAWINGS

The above and other objects and features of the present invention will become apparent from the following description of preferred embodiments given in conjunction with the accompanying drawings, in which.

DETAILED DESCRIPTION OF THE PRESENT INVENTION

Figure 2:
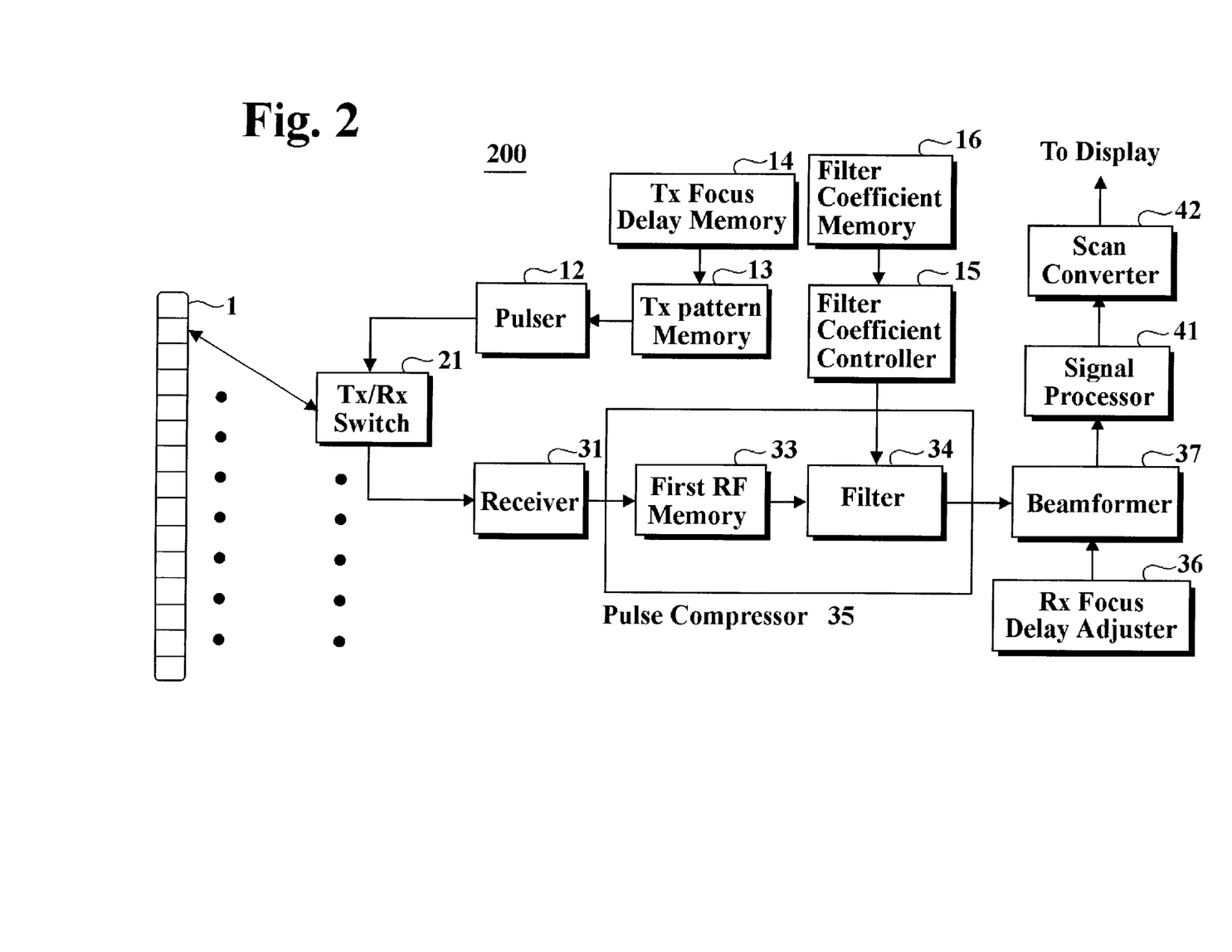
FIG. 2 shows a block diagram of an ultrasound imaging system based on pulse compression technique using a spread spectrum signal in accordance with the present invention.

Referring to FIG. 2, there is provided a block diagram of an ultrasound imaging system 200 in accordance with the present invention. Though a weighted chirp signal is used during ultrasound transmission in one embodiment of the present invention, any other spread spectrum signal having similar characteristics can be used instead of the weighted chirp signal. The ultrasound imaging system 200 of the present invention is also characterized in that a pulse compression using RF (radio frequency) data is performed prior to beamforming. The present invention eliminates side lobes in the ultrasound propagation direction in near field, which would be generated if the pulse compression was performed after RX(receiving)-focusing. And also, the present invention prevents the width of the main lobe from increasing.

In FIG. 2, the ultrasound imaging system 200 comprises a pulser 12, a TX (transmission) pattern memory 13, a TX focus memory 14, a filter coefficient controller 15, a filter coefficient memory 16, a TX/RX switch 21, a receiver 31, a pulse compressor 35, a RX focus delay adjuster 36, a beamformer 37, a signal processor 41, and a scan converter 42. The pulse compressor 35 includes a RF memory 33 and a FIR (Finite Impulse Response) filter 34.

The TX pattern memory 13 stores a TX signal pattern and the TX focus delay memory 14 stores a delay pattern for the TX signal. The TX signal pattern that is stored at the TX pattern memory 13 is applied to the pulser 12, whose pulses are delayed according to the delay pattern.

In one embodiment of the present invention, the TX pattern memory 13 and the TX focus delay memory 14 store a predetermined TX signal pattern and a predetermined delay pattern, respectively. A circuit or software may be used to produce delayed TX signal pattern.

Depending on a window used, the pulser 12 amplifies the TX signal pattern received from the TX pattern memory 13. When a rectangular window is used, a bipolar pulser can be used as the pulser 12 to apply bi-polar pulses to the array transducer 1 via the TX/RX switch 21. When windows other than the rectangular window are used, the pulser 12 may include a bi-polar pulser and a linear amplifier to output amplified bi-polar pulses to the array transducer 1. As described above in conjunction with FIG. 1, a fixed focusing technique or a synthetic aperture technique is used for transmission of the chirp signal.

Like the switch shown in FIG. 1, the TX/RX switch 21 acts as a duplexer to isolate the receiver 31 from the effect of the high voltage from the pulser 12.

A signal received by the receiver 31 cannot be directly used to form an image because it has high side lobes. Accordingly, the pulse compressor 35 is used to process the received signal in such a way that the resolution of the resultant image is compatible to that of the conventional imaging system transmitting short pulses.

First, in the pulse compressor 35, the RF signal received by the receiver 31 is stored at the RF memory 33. Since the RF signal for each channel is stored at the RF memory 33, the FIR filter 34 can be selectively constructed by using hardware or software. And also, when the conventional short pulses are used instead of the spread spectrum signal, the system shown in FIG. 2 can function as a conventional ultrasound imaging system by bypassing the FIR filter 34.

The FIR filter 34 filters the received signal from the receiver 31, stored at the RF memory 33, by using filter coefficients from the filter coefficient controller 15 to obtain a pulse compressed version of the received signal. That is, when a long pulse is transmitted, the FIR filter 34 generates an output signal that effects the same as when a short pulse is transmitted.

The filter coefficient memory 16 stores a number of sets of the filter coefficients. Each of the sets is predetermined depending on the characteristics of the original chirp signal and the window function and the frequency component used to form an ultrasound image, e.g., fundamental component or second harmonic component. The frequency component can be selected by an external input from a user (not shown).

The filter coefficient controller 15 selects a selected set of filter coefficients from those stored at the filter coefficient memory 16 and provides it to the FIR filter 34.

The beamformer 37 performs the RX-focusing by using the RX focus delay provided from the RX focus delay adjuster 36. After the RX-focusing, envelope detection and log compensation are performed by the signal processor 41 to produce a B-mode image signal. The scan converter 42 converts the B-mode image signal in such a way that it can be displayed in a display device (not shown).

As described above, an embodiment of the present invention uses a weighted chirp signal for ultrasound TX. The chirp signal has a substantially constant amplitude and a frequency which varies linearly with time over a limited frequency range. The spectrum of the chirp signal matches well with the characteristic of the narrow-band transducer used in the medical ultrasound imaging system. The Doppler shift changes the frequency of the chirp signal and this change in frequency, measured instantaneously by a FIR filter, indicates the target object's velocity. With angular frequency $\omega=\omega_0+\mu t$, that varies with time, the chirp signal can be expressed as follows:

$$S(t) = Aw_1(t)e^{-j(\omega_0 t + \frac{\mu}{2}t^2)} \qquad \text{Eq. (1)}$$

where constant A is a positive integer, $\omega_0$ is the center angular frequency, constant $\mu$ is $\Delta\omega/T$, the change in the angular frequency during time interval T and $w_1(t)$ is the envelope of the transmitted chirp signal.

For the conventional chirp signal, $w_1(t)$ is a rectangular waveform signal, i.e., $w_1(t)=\text{rect}(t/T)$. The conventional chirp signal is not adequate for medical ultrasound imaging systems because it produces peak side lobes of about −13 dB around the main lobe. That is, the resolution desired for a medically useful image cannot be obtained by using such conventional chirp signal.

Accordingly, the present invention discloses a system in which the envelope of a chirp signal is weighted by using a window function and filter coefficients are modified. The chirp signal may be weighted by a window function other than the rectangular window function in Eq. (1) as long as it is adjusted to have low side lobes and a narrow main lobe.

Figure 3A:
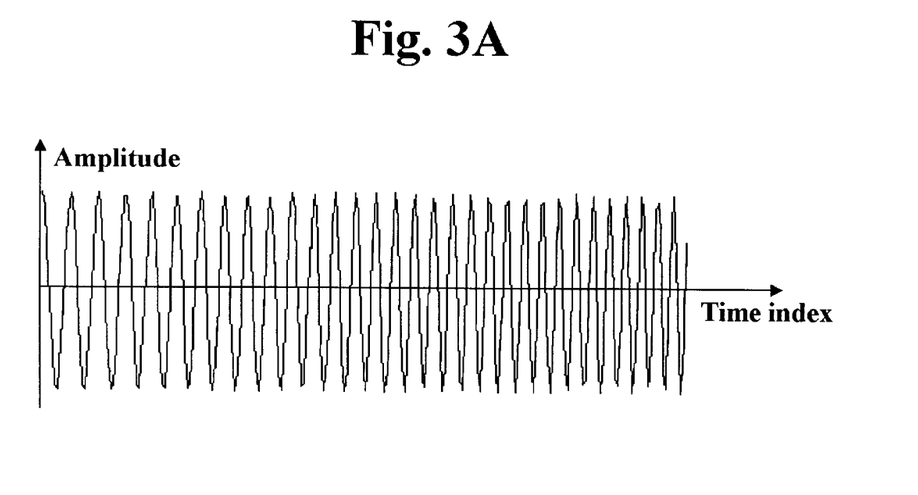
FIG. 3A offers a graph of a conventional chirp signal as an example of the spread spectrum signal.

FIG. 3A offers a graph of a conventional chirp signal.

Figure 3B:
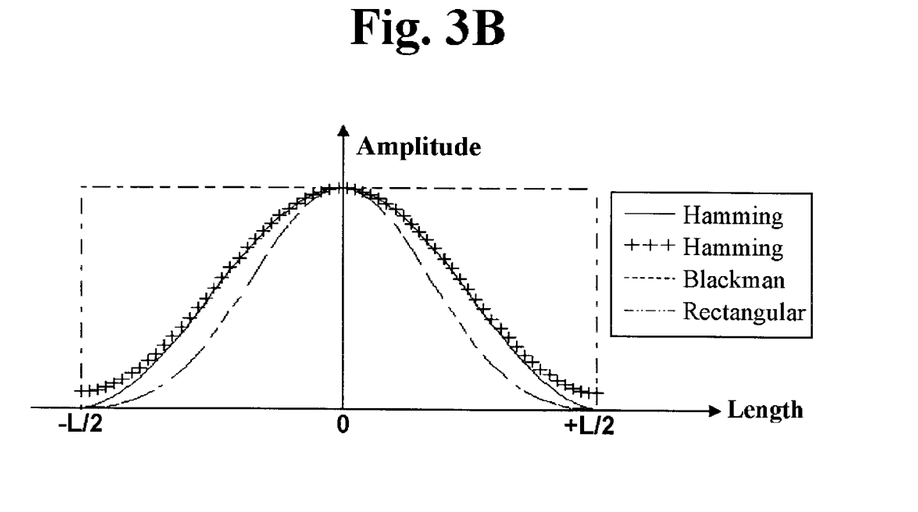
FIG. 3B presents graphs of exemplar windows for use in the present invention.

FIG. 3B presents a Hamming window, a Hanning window, a Blackman window and a rectangular window for use in the present invention.

Figure 3C:
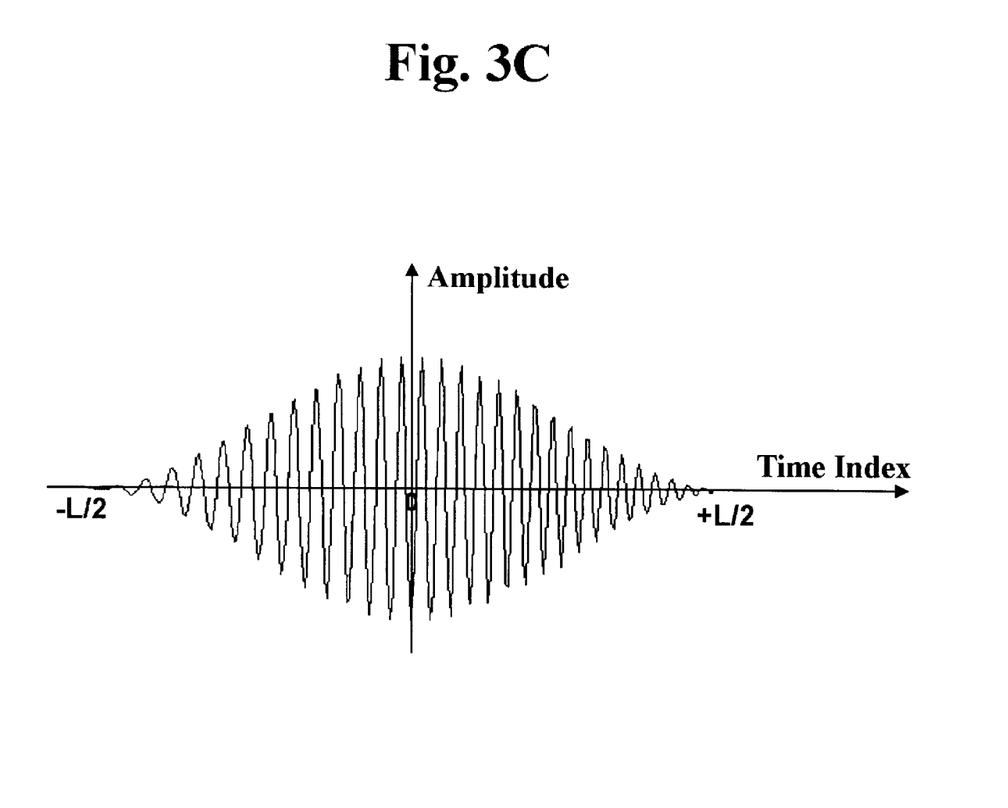
FIG. 3C illustrates a chirp signal weighted by Hanning window.

FIG. 3C illustrates a chirp signal weighted by a Hanning window. In FIGS. 3B and 3C, L denotes the number of the filter coefficients. In order to apply the weighted chirp signal to the transducer, a pulser which can non-discretely amplify the signal as described above is needed rather than a pulser 11 which provides only two discrete values.

The filter output signal of the weighted chirp signal depends on the window function $w_1(t)$ for modifying the chirp signal and the window function $w_2(t)$ for modifying the filter coefficients as shown in Eq. (2):

$$y(t) = A^2 e^{j(\omega_0 t + \frac{\mu}{2}t^2)} \int_{-\infty}^{\infty} w_1(\xi) w_2(t+\xi) e^{j\mu t \xi} d\xi \qquad \text{Eq. (2)}$$

And the filter coefficients are computed depending on the characteristics of the window function used for the FIR filter and the original chirp signal and also depending on whether the fundamental or harmonic frequency component of a received signal is used.

Though the transmit power efficiency decreases because the weighted chirp signal is obtained by modifying the envelope of a conventional chirp signal, it is not materialized by an increase of SNR to be obtained by pulse compression technique. Accordingly, the window functions should be selected in consideration of TPE (Transmit Power Efficiency) defined by the ratio of transducer output power to transducer input power. Further, because the resolution of an ultrasound image depends on the levels of side lobes and the width of the main lobe of the pulse-compressed signal, it is desirable to select a window function that would yield the lowest side lobes and narrowest main lobe. In other words, TX/RX window functions employed in the medical ultrasound imaging system of the present invention should be selected in consideration of the main lobe width and peak side lobes of the filter output, and TX power efficiency.

On the other hand, the FIR filter 34 as described above should be included for each channel. The coefficients of the FIR filter 34 have continuous values in case that a weighted chirp signal is used or the modified filter coefficients are used. Thus, the structure of the FIR filter 34 having multipliers and adders becomes complicated, which renders the overall imaging system complex.

Figure 4A:
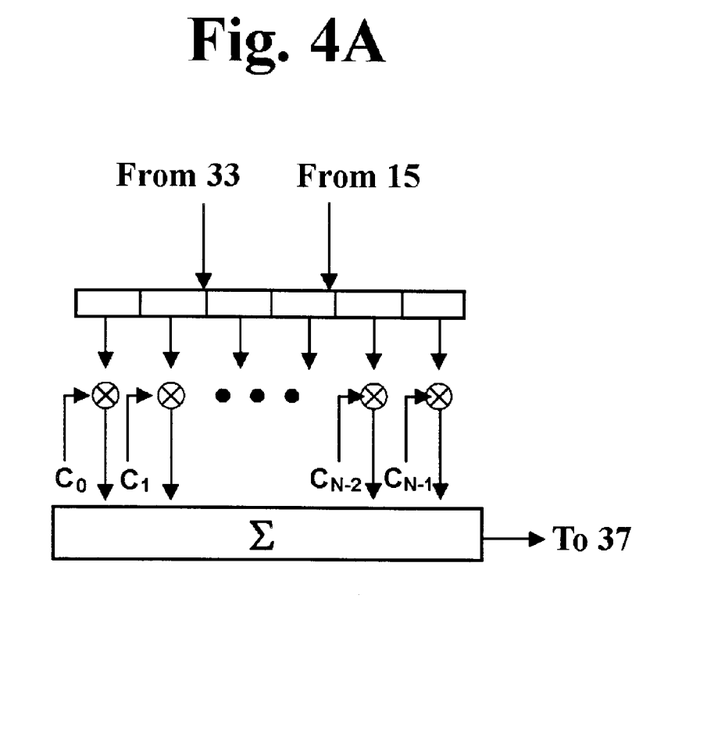
FIG. 4A represents a conventional FIR filter.

FIG. 4A represents a conventional FIR filter implemented in the form of a conventional matched filter. The longer the duration of the transmitted signal is, the longer the FIR filter becomes, which increases hardware complexity of the FIR filter.

Figure 4B:
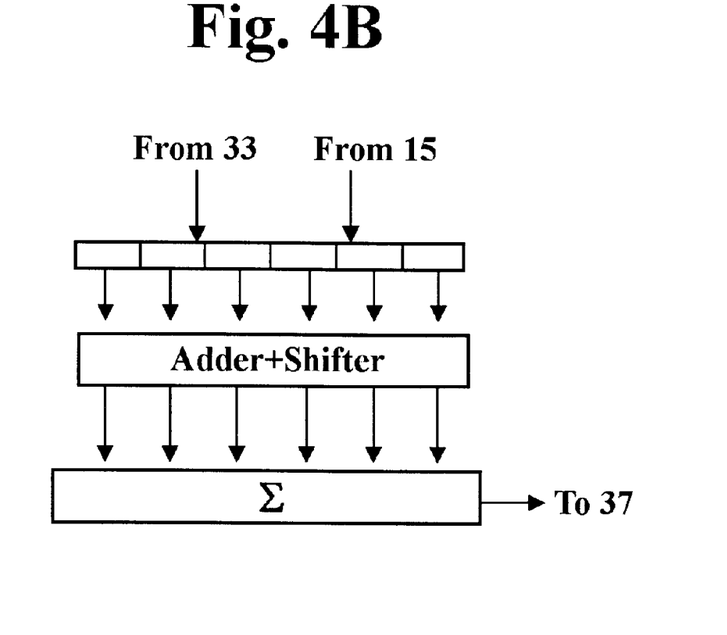
FIG. 4B offers a FIR filter in accordance with the present invention.

FIG. 4B shows a structure of the FIR filter 34 in accordance with the present invention. Hardware complexity of the FIR filter 34 due to continuous value of the filter coefficient is mainly caused by multipliers. Accordingly, the present invention reduces the hardware complexity of the receiving part because the FIR filter 34 designed using a genetic algorithm does not have multipliers. The filter coefficients used to compute correlation are quantized to ones of $2^n$s or a sum of them. Such quantization allows the FIR filter 34 to be constructed by using only adders and shifters as shown in FIG. 4B.

Figure 5:
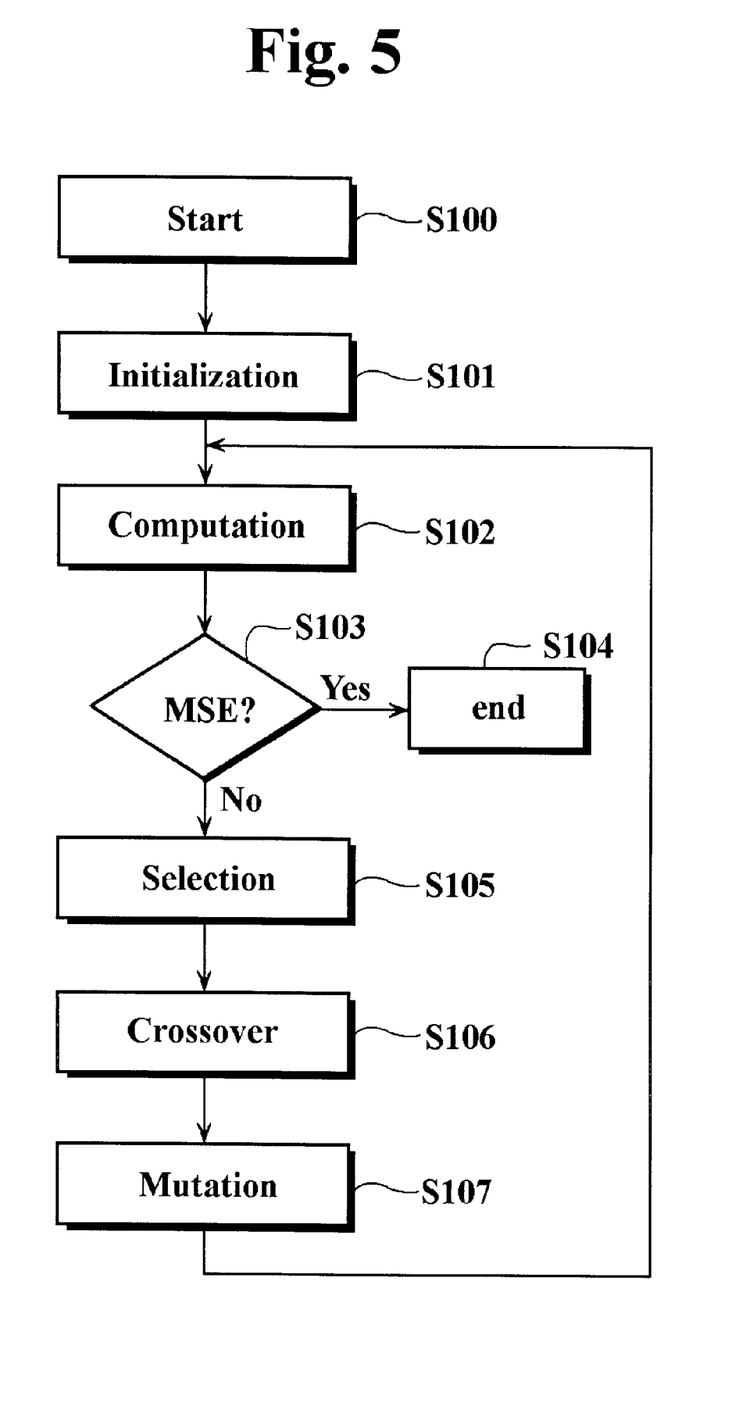
FIG. 5 is a flow chart of genetic algorithm used in determination of the filter coefficients in an embodiment of the present invention.

FIG. 5 is a flow chart of a genetic algorithm used in determining the filter coefficients in an embodiment of the present invention.

The genetic algorithm is an algorithm for modeling biological evolution, which is a procedure of selecting chromosomes among population depending on an objective function and applying genetic operation to produce next population (D. E. Goldberg, "Genetic algorithm in search, optimization, and machine learning", Addison-Wesley Company Inc., 1989). In the genetic algorithm, the population is a set of chromosomes and, generally, the chromosome is a string having fixed length. Each of the sets of chromosomes that are generated initially randomly is evaluated using the objective function and then some of the chromosomes are selected as parents of next population by selection operation to produce better chromosomes in the next population. The selected chromosomes produce new chromosomes of the next population by crossover and mutation operations.

For example, when the number of the filter coefficients is 512 and the length of the coefficient is 8-bit, a string of 4096 bits for representing the whole 512 coefficients corresponds to a chromosome. The chromosome is evaluated by an objective function such as MSE (mean square error) and Minimax (minimum local maximum) as described above. In one embodiment of the present invention, the MSE in Eq. (3) will be used:

$$MSE = \frac{1}{2N-1} \sum_{i=0}^{2N-2} [R_{mm}(i) - R_{md}(i)]^2 \qquad \text{Eq. (3)}$$

Where $R_{mm}(i)$ is the filter output when the conventional FIR filter is used and the $R_{md}(i)$ is the filter output when the FIR filter designed in accordance with the present invention is used. And N is the number of filter coefficients.

Referring to FIG. 5, steps for determining the filter coefficients of the FIR filter 34 using the genetic algorithm are described.

At step S101, the initial values of a set of bit strings, each bit quantized to replace multipliers with adders and shifters, are randomly generated.

At step S102, the MSE for each of the generated bit strings is computed by using Eq. (3).

At step S103, it is determined, for each bit string, whether the computed MSE is adequate for the medical application. If the MSE is found adequate then the corresponding bit string is selected as correlation coefficient.

Otherwise, at step S105, part of the generated string set is selected and, at step S106 and S107, the selected strings are crossover-operated and/or mutation-operated and the MSE for the new string is computed again at step S102.

As described above, when each of the filter coefficients is quantized to have a value which can be represented by one of $2^n$s or a sum of them, the system can be simplified because the FIR filter 34 can be constructed by adders and shifters only.

On the other hand, whenever the center frequency of the TX signal is changed, the filter coefficient should use the coefficients computed for the new center frequency. In the present invention, in order to use the same coefficients for the same TX signal, a sampling frequency with which the TX pattern is applied from the TX pattern memory to the pulser 12 is changed when the center frequency is changed. That is, the ratio of the center frequency to the sampling frequency remains constant while the speed of feeding the RX signal from the RF memory 33 to the FIR filter 34 is changed based on the sampling frequency.

In another embodiment of the present invention, instead of transmitting a continuous weighted chirp signal, a signal quantized by using the genetic algorithm as described above may be transmitted. In this case, the pulser 12 can be implemented by using a digital-to-analog converter instead of a more costly linear amplifier.

In FIGS. 6A to 7C, the center frequency, the sampling frequency and the bandwidth of the original chirp signal, are 5 MHz, 40 MHz and 3 MHz, respectively. And the original chirp signal is quantized to a 8-bit signal and the filter coefficients are modified by using the Hanning window. In FIGS. 6A to 7C, notation L represents the number of the filter coefficients.

Figure 6A:
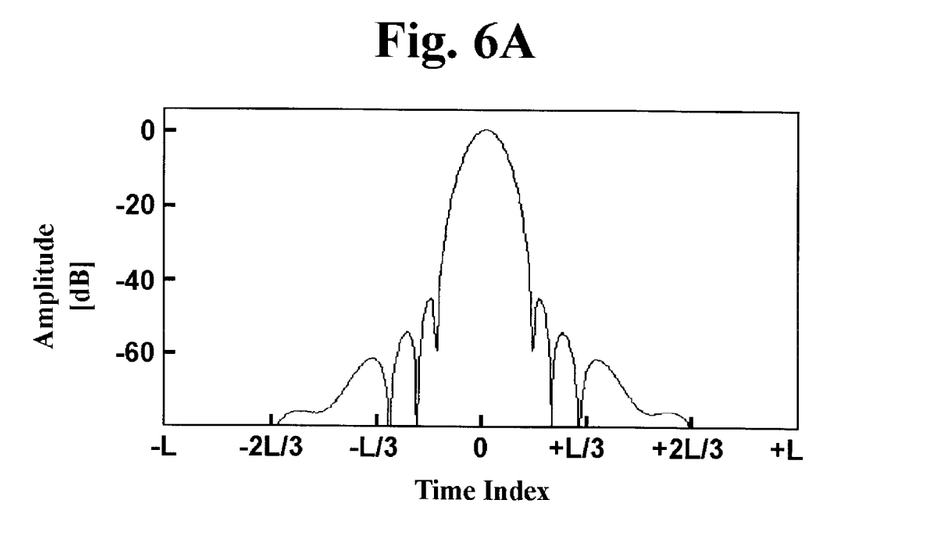
FIG. 6A shows the filter output for fundamental frequency component of the chirp signal weighted by the Hanning window.
Figure 6B:
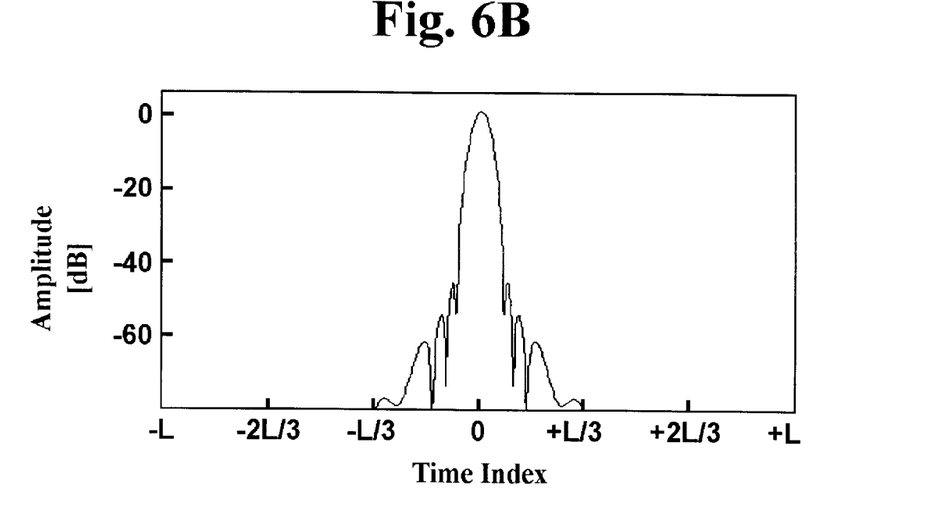
FIG. 6B presents the filter output for second harmonic component of the chirp signal weighted by the Hanning window.

FIG. 6A shows the filter output for the fundamental frequency component of the chirp signal weighted by the Hanning window. As shown in FIG. 6A, the width of the main lobe has not been changed and also the level of the side lobes is adequate for the medical ultrasound imaging system. Therefore, it can be well appreciated that the FIR filter 34 where the multipliers are eliminated gives a desired system performance and significantly reduced hardware complexity FIG. 6B presents the filter output for the second harmonic component of the chirp signal weighted by the Hanning window. The filter output shown in FIG. 6B has narrower main lobe and lower side lobes than those shown in FIG. 6A. Therefore, the ultrasound image of better quality can be formed if the filter coefficients are selected in consideration of the harmonic components in some cases.

Figure 7A:
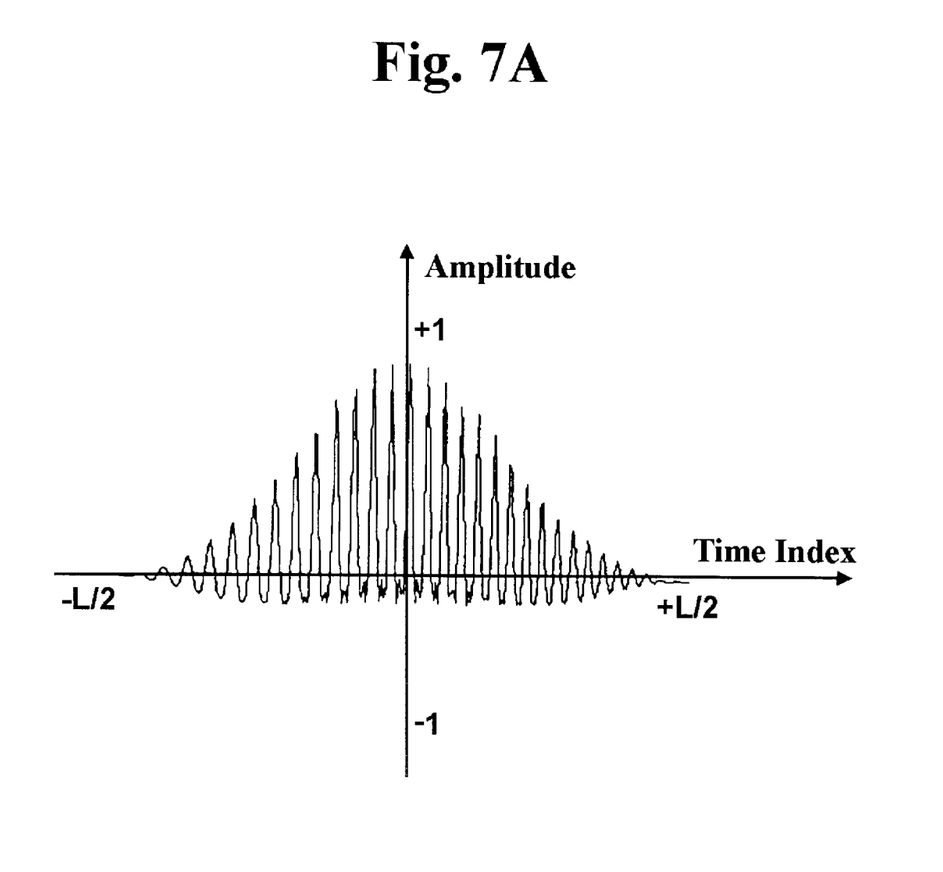
FIG. 7A illustrates a received signal including the fundamental frequency and the second harmonic components.

FIG. 7A illustrates an exemplary received signal including the fundamental frequency and the second harmonic components, which is applied to the FIR filter 34. The harmonic components are generated due to, for example, non-linear propagation. By using the harmonic components, the ultrasound image of better quality can be obtained depending on the target object.

Figure 7B:
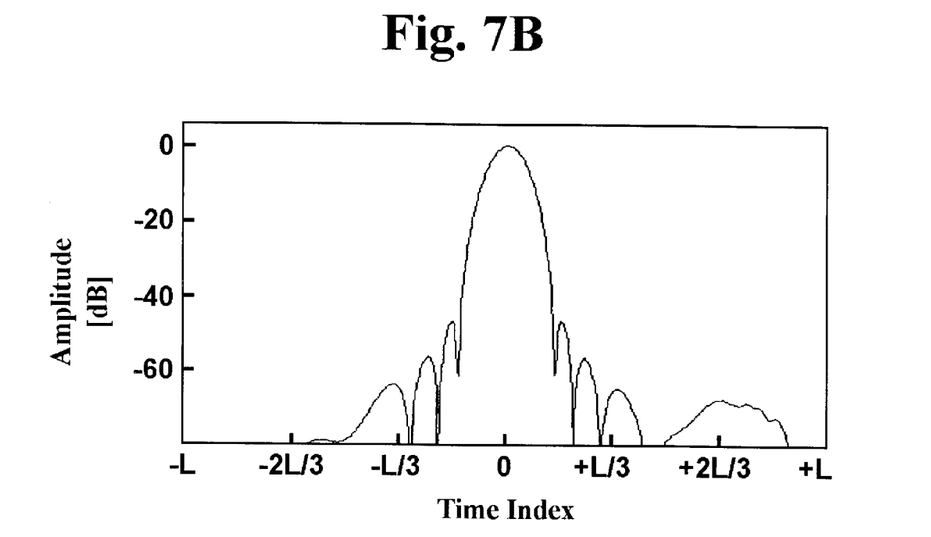
FIG. 7B presents the filter output for the fundamental frequency component of the received signal shown in FIG. 7A.

FIG. 7B presents the filter output for the fundamental frequency component of the received signal shown in FIG. 7A. In FIG. 7B, it can be well appreciated that the width of the main lobe and the level of the side lobes, obtained from the fundamental frequency component of the received signal, are adequate for a medical imaging system. Though the side lobes shown in the right end of the graph in FIG. 7B are generated because of the second harmonic component, they are lower than −60 dB and do not degrade system performance significantly.

Figure 7C:
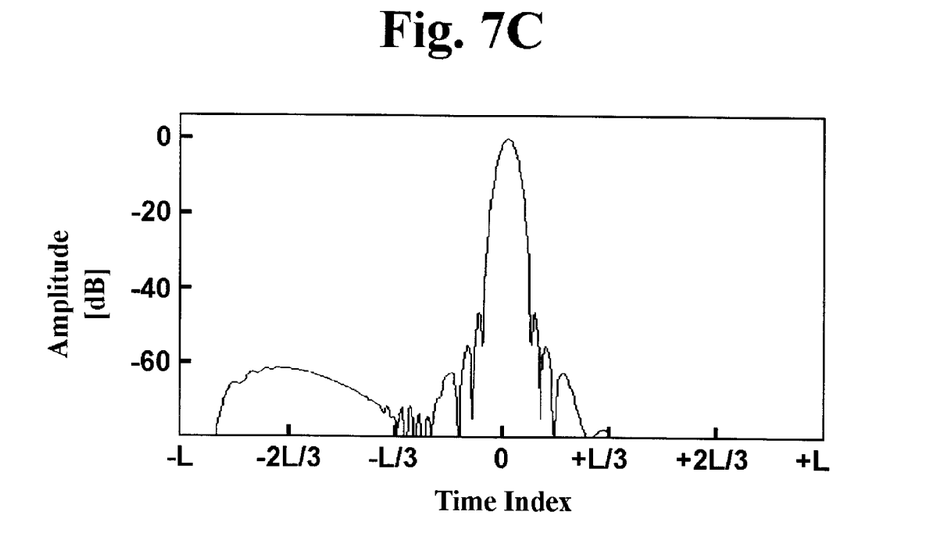
FIG. 7C offers the filter output for the second harmonic component of the received signal shown in FIG. 7A.

FIG. 7C presents the filter output for the second harmonic component of the received signal shown in FIG. 7A. In FIG. 7C, it can be well appreciated that the width of the main lobe and the level of the side-lobe, obtained from the second harmonic of the received signal, are adequate for a medical imaging system. Though the side lobes shown in the left end of the graph in FIG. 7C are generated due to the fundamental frequency component, they are lower than −60 dB and do not degrade system performance significantly.

As described above, the pulse compression system using the weighted spread spectrum signal in accordance with the present invention is adequate for a medical ultrasound imaging system in terms of the width of the main lobe and the peak side lobes. Especially, by weighting a spread spectrum signal with a window function and performing the pulse compression prior to RX focusing, side lobes of the received signal can be reduced and the quality of the ultrasound image can be improved.

Furthermore, this invention simplifies hardware construction of the FIR filter 34 because multipliers are not needed with the use of a genetic algorithm.

While there has been described and illustrated, it will be apparent to those skilled in the art that variations and modifications are possible without deviating from the broad principles and teachings of the present invention which should be limited solely by the scope of the claims appended hereto.

What is claimed is:

1. An ultrasound imaging method for forming an image of an object, the method comprising the steps of:
   (a) converting a predetermined first spread spectrum signal to an ultrasound signal and transmitting the ultrasound signal to the object;
   (b) receiving a reflected signal of the ultrasound signal reflected from the object and pulse compressing the reflected signal to provide a pulse compressed signal; and
   (c) processing the pulse compressed signal to produce a receive-focused signal and generating an image of the object from the receive-focused signal,
      wherein the step (b) comprises the step of filtering the reflected signal with preset filter coefficients, and
      wherein the predetermined first spread spectrum signal is a weighted spread spectrum signal produced by applying a second window over a predetermined second spread spectrum signal, and the preset filter coefficients are determined by modifying finite impulse response (FIR) filter coefficients of the predetermined second spread spectrum signal and quantizing the modified FIR filter coefficients to have one of $2^n$s and a sum of the $2^n$s by applying a genetic algorithm over the modified FIR filter coefficients.

2. The method of claim 1, wherein the predetermined first spread spectrum signal is converted to the ultrasound signal at one or more transducers.

3. The method of claim 1, wherein the predetermined first spread spectrum signal is produced by applying a first window function over a chirp signal.

4. The method of claim 3, wherein the first window function is one of a Hamming window, a Hanning window and Blackman window.

5. The method of claim 1, wherein the FIR filter coefficients are modified by applying a window over the FIR filter coefficients.

6. The method of claim 1, wherein the first spread spectrum signal is a quantized signal that is obtained by using a genetic algorithm.

7. The method of claim 1, wherein the pulse compressed signal is provided for one of a fundamental frequency component signal and harmonic component signals of the reflected signal.

8. A method of determining filter coefficients for use in an ultrasound imaging system and method for forming an image of an object, comprising the steps of:
   (a) computing FIR (finite impulse response) filter coefficients of a predetermined spread spectrum signal; and
   (b) quantizing the FIR filter coefficients to have one of $2^n$s or a sum of the $2^n$s by applying a genetic algorithm over the FIR filter coefficients.

9. An ultrasound imaging apparatus for forming an image of an object, the apparatus comprising:
   one or more transducers for transmitting an ultrasound signal to the object in response to a predetermined spread spectrum signal;
   pulse compression means for receiving a reflected signal of the transmitted ultrasound signal from the object and pulse compressing the reflected signal to provide a pulse-compressed signal; and
   image forming means for processing the pulse-compressed signal to produce a receive-focused signal and generating the image of the object from the received-focused signal,
   wherein the pulse compression means comprises means for filtering the reflected signal by using filter coefficients, the filter coefficients being determined by computing FIR filter coefficients of the spread spectrum signal and quantizing the FIR filter coefficients to have one of $2^n$s and a sum of the $2^n$s by applying a genetic algorithm over the FIR filter coefficients, the filtering means being constructed by using addition devices and shift devices.

10. The apparatus of claim 9, wherein the spread spectrum signal is a weighted chirp signal produced by applying a window over a chirp signal.

11. The apparatus of claim 9, wherein pulse compression means includes means for filtering the reflected signal with preset filter coefficients.

12. The apparatus of claim 9, wherein the spread spectrum signal is a quantized signal that is obtained by using a genetic algorithm.

13. The apparatus of claim 9, wherein the pulse-compressed signal is provided for one of a fundamental frequency component signal and harmonic component signals of the reflected signal.

* * * * *